(12) United States Patent
Sato et al.

(10) Patent No.: US 11,679,457 B2
(45) Date of Patent: Jun. 20, 2023

(54) ASSEMBLING DEVICE

(71) Applicant: SUBARU CORPORATION, Tokyo (JP)

(72) Inventors: Yoichi Sato, Tokyo (JP); Marosuke Kikuchi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 16/947,999

(22) Filed: Aug. 27, 2020

(65) Prior Publication Data

US 2021/0094133 A1 Apr. 1, 2021

(30) Foreign Application Priority Data

Sep. 30, 2019 (JP) .............................. JP2019-180416

(51) Int. Cl.
   B23P 19/04 (2006.01)
   B25J 11/00 (2006.01)
   (Continued)

(52) U.S. Cl.
   CPC ............... B23P 19/04 (2013.01); B23P 17/02 (2013.01); B25J 11/005 (2013.01); *B23P 13/00* (2013.01);
   (Continued)

(58) Field of Classification Search
   CPC ........... B23P 13/00; B23P 17/02; B23P 19/04; B23P 2700/01; B25J 11/005;
   (Continued)

(56) References Cited

U.S. PATENT DOCUMENTS 3,979,817 A * 9/1976 Cheak .................. B27M 3/0006
   29/434
7,043,331 B2 * 5/2006 Sigtryggsson ........... B27M 1/08
   700/184
(Continued)

FOREIGN PATENT DOCUMENTS

EP   3 315 418 A1   5/2018
JP   1-295726 A   11/1989
(Continued)

OTHER PUBLICATIONS

Extended European Search Report issued in corresponding European Patent Application No. 20 19 2968 dated Feb. 26, 2021.
(Continued)

*Primary Examiner* — Jermie E Cozart
(74) *Attorney, Agent, or Firm* — Troutman Pepper Hamilton Sanders LLP

(57) ABSTRACT

An assembling device includes a holding member and a processing device. The holding member is configured to hold a first assembly component and a second assembly component. The processing device is configured to process a first excess thickness portion and a second excess thickness portion. The first excess thickness portion is provided at the first assembly component and is configured to adjust a gap between the first assembly component and the second assembly component. The second excess thickness portion is provided at the second assembly component and is configured to adjust the gap.

11 Claims, 3 Drawing Sheets

(51) Int. Cl.
*B23P 17/02* (2006.01)
*B23P 13/00* (2006.01)

(52) U.S. Cl.
CPC ........ *B23P 2700/01* (2013.01); *B25J 11/0055* (2013.01); *Y10T 29/49726* (2015.01); *Y10T 29/49748* (2015.01); *Y10T 29/49762* (2015.01); *Y10T 29/49813* (2015.01); *Y10T 29/49861* (2015.01); *Y10T 29/49895* (2015.01); *Y10T 29/49996* (2015.01); *Y10T 29/49998* (2015.01); *Y10T 29/5138* (2015.01)

(58) Field of Classification Search
CPC ............ B25J 11/0055; Y10T 29/49998; Y10T 29/49748; Y10T 29/49762; Y10T 29/49861; Y10T 29/49813; Y10T 29/49996; Y10T 29/49726; Y10T 29/49895; Y10T 29/5138
See application file for complete search history.

(56) References Cited

U.S. PATENT DOCUMENTS

| | | |
|---|---|---|
| 10,324,426 B2 | 6/2019 | Nakashima et al. |
| 2002/0078545 A1 | 6/2002 | Munk et al. |
| 2019/0031315 A1 | 1/2019 | Edwards et al. |

FOREIGN PATENT DOCUMENTS

| | | |
|---|---|---|
| JP | 2001-300823 A | 10/2001 |
| JP | 2016-192237 A | 11/2016 |
| WO | 2014/168681 A1 | 10/2014 |

OTHER PUBLICATIONS

Notice of Reasons for Refusal issued in Japanese Patent Application No. 2019-180416 dated Apr. 25, 2023, with machine translation.

* cited by examiner

ASSEMBLING DEVICE

CROSS-REFERENCE TO RELATED APPLICATIONS

The present application claims priority from Japanese Patent Application No. 2019-180416 filed on Sep. 30, 2019, the entire contents of which are hereby incorporated by reference.

BACKGROUND

The disclosure relates to an assembling device.

For example, when assembling the fuselage and wings of an aircraft, a shim is inserted into a gap between a plurality of assembly components and the gap is filled with the shim. Japanese Unexamined Patent Application Publication (JP-A) No. 2016-192237 discloses a method of manufacturing a shim by measuring the thickness of a gap between a plurality of assembly components and three-dimensionally machining a workpiece by a processing machine on the basis of the distribution of the measured gap thickness.

SUMMARY

An aspect of the disclosure provides an assembling device including a holding member and a processing device. The holding member is configured to hold a first assembly component and a second assembly component. The processing device is configured to process a first excess thickness portion and a second excess thickness portion. The first excess thickness portion is provided at the first assembly component and is configured to adjust a gap between the first assembly component and the second assembly component. The second excess thickness portion is provided at the second assembly component and is configured to adjust the gap.

BRIEF DESCRIPTION OF THE DRAWINGS

The accompanying drawings are included to provide a further understanding of the disclosure and are incorporated in and constitute a part of this specification. The drawings illustrate embodiments and, together with the specification, serve to explain the principles of the disclosure.

DETAILED DESCRIPTION

In JP-A No. 2016-192237, the step of measuring a gap between a plurality of assembly components, the step of manufacturing a shim, and the step of inserting the shim are performed. Therefore, an assembly operation of assembling the assembly components may be complicated.

It is desirable to provide an assembling device that makes it possible to facilitate an assembly operation of assembling assembly components.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
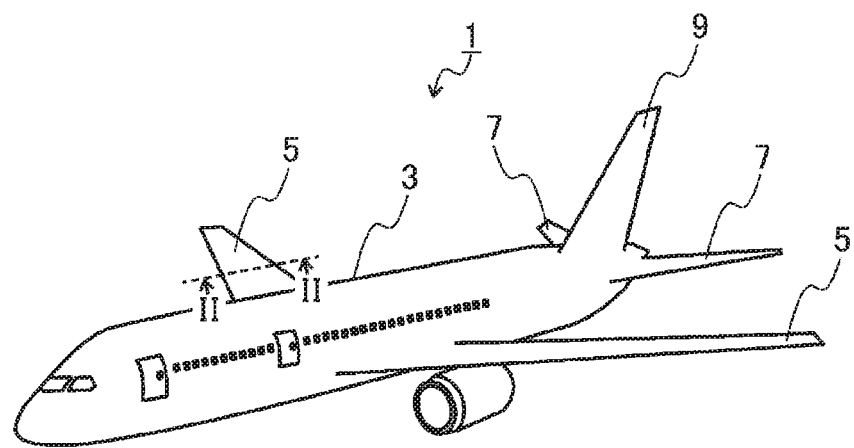
FIG. 1 is a schematic perspective view of an aircraft.

FIG. 1 is a schematic perspective view of an aircraft 1. As illustrated in FIG. 1, the aircraft 1 includes a fuselage 3, main wings 5, horizontal tails 7, and a vertical tail 9. The main wings 5, the horizontal tails 7, and the vertical tail 9 may also be simply referred to as "wings" below.

The fuselage 3 extends in a roll axis direction that joins the nose side and the tail side of the aircraft 1 with each other. Each main wing 5 is provided on a central portion of the fuselage 3 in the roll axis direction. The main wings 5 are provided in a pair, one on the left side and one on the right side of the fuselage 3 in a pitch axis direction orthogonal to the roll axis direction. The main wings 5 extend outward from the fuselage 3 in the pitch axis direction. Each main wing 5 has the function of generating a vertically upward lift at the aircraft 1.

The horizontal tails 7 are provided on the fuselage 3 rearward of (on the tail side with respect to) the main wings 5. The horizontal tails 7 are provided in a pair, one on the left side and the other on the right side of the fuselage 3 in the pitch axis direction. The horizontal tails 7 extend outward from the fuselage 3 in the pitch axis direction. Each horizontal tail 7 has the function of maintaining the stability of the aircraft 1 around the pitch axis.

The vertical tail 9 is provided on the fuselage 3 rearward of (on the tail side with respect to) the main wings 5. The vertical tail 9 extends outward from the fuselage 3 in a yaw axis direction orthogonal to the roll axis direction and the pitch axis direction. The vertical tail 9 has the function of maintaining the stability of the aircraft 1 around the yaw axis.

Figure 2:
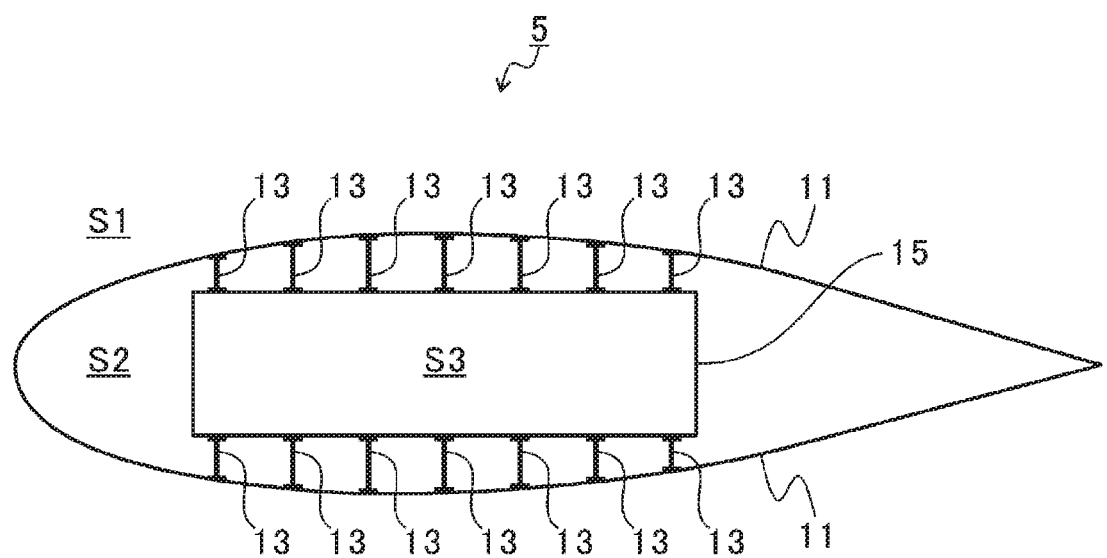
FIG. 2 is a schematic sectional view along line II-II of a main wing illustrated in FIG. 1.

FIG. 2 is a schematic sectional view along line II-II of a main wing 5 illustrated in FIG. 1. As illustrated in FIG. 2, the main wing 5 includes a skin 11, stringers 13, and a rib 15. In one embodiment, the skin 11 may serve as a "panel", the stringers 13 may serve as "first assembly components", and the rib 15 may serve as a "second assembly component".

The skin 11 is constituted by a plate member and is formed into a streamline-shaped wing. An outer surface of the skin 11 is exposed to an external space S1, and an accommodation space S2 is formed on an inner side of the skin 11. Each stringer 13 has an I shape and is accommodated in the accommodation space S2. One end of each stringer 13 is coupled to the skin 11 and the other end of each stringer 13 is coupled to the rib 15. In the present embodiment, each stringer 13 is integrated with the skin 11. However, each stringer 13 may be formed separately from the skin 11 and affixed to the skin 11.

The rib 15 has a hollow rectangular shape and is accommodated in the accommodation space S2. The rib 15 spaced apart from the skin 11 is supported by the stringers 13. The rib 15 has a fuel containing space S3 therein. In the present embodiment, the rib 15 functions as a part of a fuel tank. In addition, the rib 15 functions as a reinforcing member that reinforces the main wing 5.

The main wing 5 is assembled by placing the rib 15 on the stringers 13 integrated with the skin 11 and by fastening the stringers 13 and the rib 15 with a fastener (for example, a bolt). In the present embodiment, the main wing 5 is assembled by an assembling device 100.

Figure 3:
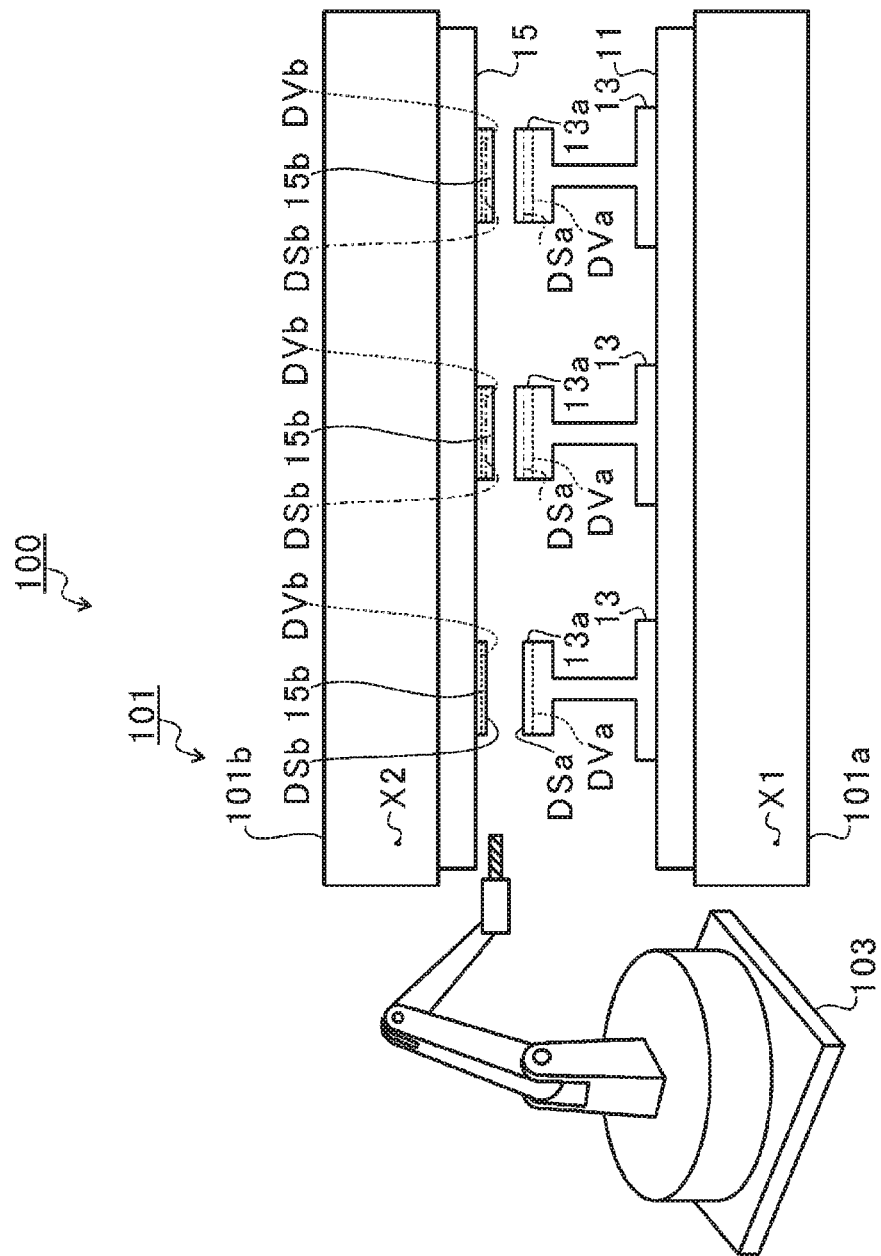
FIG. 3 is a schematic structural view illustrating a structure of an assembling device according to an embodiment.

FIG. 3 is a schematic structural view illustrating a structure of the assembling device 100 according to the present embodiment. In order to make it easier to view FIG. 3, the rib 15 is illustrated as having a planar shape. As illustrated in FIG. 3, the assembling device 100 includes a holding member 101 and a processing device 103. The holding member 101 includes a first holding member 101a and a second holding member 101b.

The first holding member 101a is, for example, a jig, and is disposed below the skin 11 and the stringers 13 in a vertical direction. The first holding member 101a holds the skin 11 and the stringers 13 in an assembly orientation at a location below the skin 11 and the stringers 13 in the vertical direction. A reference position (a reference mark) X1 that serves as a reference for a processing position where processing is performed by the processing device 103 exists on the first holding member 101a.

The second holding member 101b is, for example, a jig, and is disposed above the rib 15 in the vertical direction. The second holding member 101b holds the rib 15 in an assembly orientation at a location above the rib 15 in the vertical direction. A reference position (a reference mark) X2 that serves as a reference for a processing position where processing is performed by the processing device 103 exists on the second holding member 101b.

The skin 11 and the stringers 13 in the assembly orientation face the rib 15 in the vertical direction. In the present embodiment, the first holding member 101a is formed separately from the second holding member 101b and faces the second holding member 101b in the vertical direction. However, the first holding member 101a and the second holding member 101b may be integrated with each other.

As illustrated in FIG. 3, each stringer 13 includes a first excess thickness portion 13a. In FIG. 3, a design shape (a design value) DVa of each stringer 13 is illustrated by a broken line. Hitherto, each stringer has been formed with this design shape DVa. In the present embodiment, the shape of each stringer 13 is larger than the design shape DVa. A portion of each stringer 13 situated outward with respect to the design shape DVa is the first excess thickness portion 13a. That is, each stringer 13 of the present embodiment has a portion that is larger than the design shape DVa, and the larger portion corresponds to the first excess thickness portion 13a. Each first excess thickness portion 13a is provided close to (on a side facing) the rib 15 with respect to the design shape DVa of the stringer 13.

In the present embodiment, each first excess thickness portion 13a is formed by forming each stringer 13 larger than the design shape DVa, and is integrated with the corresponding stringer 13. However, each first excess thickness portion 13a may be formed separately from the corresponding stringer 13. For example, it is possible to form each stringer 13 with the design shape DVa, mount an adjustment member, such as a shim or a spacer, on a surface of each stringer 13 facing the rib 15, and form the adjustment member as the first excess thickness portion 13a.

In the present embodiment, each first excess thickness portion 13a is made of a metal. For example, each first excess thickness portion 13a is made of a metal that is the same as the metal out of which each stringer 13 is made. However, each first excess thickness portion 13a may be made of a metal differing from the metal out of which each stringer 13 is made, or may be made of a material differing from a metal. For example, each first excess thickness portion 13a may be made of a composite material.

The rib 15 includes second excess thickness portions 15b. In FIG. 3, a design shape (a design value) DVb of the rib 15 is illustrated by a broken line. Hitherto, the rib 15 has been formed with this design shape DVb. In the present embodiment, the shape of the rib 15 is larger than the design shape DVb. Portions of the rib 15 situated outward with respect to the design shape DVb are the second excess thickness portions 15b. That is, the rib 15 of the present embodiment has portions that are larger than the design shape DVb, and the larger portions correspond to the second excess thickness portions 15b. Each second excess thickness portion 15b is provided close to (on a side facing) the stringers 13 with respect to the design shape DVb of the stringer 13.

In the present embodiment, each second excess thickness portion 15b is formed by forming the rib 15 larger than the design shape DVb, and is integrated with the rib 15. However, each second excess thickness portion 15b may be formed separately from the rib 15. For example, it is possible to form the rib 15 with the design shape DVb, mount adjustment members, such as shims or spacers, on a surface of the rib 15 facing the stringers 13, and form the adjustment members as the second excess thickness portions 15b.

In the present embodiment, each second excess thickness portion 15b is made of a metal. For example, each second excess thickness portion 15b is made of a metal that is the same as the metal out of which the rib 15 is made. However, each second excess thickness portion 15b may be made of a metal differing from the metal out of which the rib 15 is made, or may be made of a material differing from a metal. For example, each second excess thickness portion 15b may be made of a composite material.

In this way, the stringers 13 of the present embodiment include the corresponding first excess thickness portions 13a, and the rib 15 of the present embodiment includes the second excess thickness portions 15b, the first excess thickness portions 13a and the second excess thickness portions 15b being provided for adjusting a gap between the stringers 13 and the rib 15. The first excess thickness portions 13a and the second excess thickness portions 15b face each other in the vertical direction.

The processing device 103 is, for example, an NC processing machine, and performs NC processing on the first excess thickness portions 13a of the stringers 13 and the second excess thickness portions 15b of the rib 15. In the present embodiment, the processing device 103 includes a cutting tool, and cuts the first excess thickness portions 13a and the second excess thickness portions 15b. However, the processing device 103 may include a grinding tool, and may grind the first excess thickness portions 13a and the second excess thickness portions 15b.

When the fuselage 3 and the wings (the main wings 5, the horizontal tails 7, and the vertical tail 9) of the aircraft 1 are to be assembled, a gap may be formed between the plurality of assembly components. Hitherto (for example, in JP-A No. 2016-192237), the thickness of the gap between the plurality of assembly components has been measured, a shim has been manufactured by machining a workpiece three-dimensionally by a processing machine on the basis of the distribution of the measured gap thickness, and then the shim has been inserted into the gap to fill the gap with the shim.

In this way, hitherto, in order to fill the gap between the plurality of assembly components, many operational steps, such as the step of measuring the gap between the plurality of assembly components, the step of manufacturing a shim, and the step of inserting the shim, have been performed. Therefore, the assembly operation of assembling the assembly components may be complicated.

The assembly operation of assembling a main wing 5 by the assembling device 100 of the present embodiment is described below. As illustrated in FIG. 3, first, the first holding member 101a holds the skin 11 and the stringers 13 with the main wing 5 in an assembly orientation. The second holding member 101b holds the rib 15 with the main wing 5 in the assembly orientation.

Here, as described above, the stringers 13 include the respective first excess thickness portions 13a for adjusting a facing interval with respect to the rib 15. The rib 15 includes the second excess thickness portions 15b for adjusting the facing interval with respect to the stringers 13. In the assembly orientation, the first excess thickness portions 13a and the second excess thickness portions 15b spaced apart from each other in the vertical direction face each other. In one embodiment, the facing interval may correspond to a "gap".

Next, the processing device 103 performs NC processing on the first excess thickness portions 13a and the second excess thickness portions 15b. In FIG. 3, an assembly design shape (a design value) DSa of the skin 11 and the stringers 13 in which the reference position X1 on the first holding member 101a serves as a reference is illustrated by an alternate long and short dashed lines. The assembly design shape DSa is an ideal shape in terms of design when the skin 11 and the stringers 13 in the assembly orientation are held by the first holding member 101a. It is desirable that the design shape DVa of the stringers 13 above be the same as the assembly design shape DSa. However, due to, for example, manufacturing errors occurring when the skin 11 and the stringers 13 have been manufactured or distortions caused by the self-weights of the skin 11 and the stringers 13 in the assembly orientation, the design shape DVa may not be the same as the assembly design shape DSa. FIG. 3 illustrates the case in which the design shape DVa deviates from the assembly design shape DSa due to the effect of, for example, manufacturing errors or distortions.

With reference to the reference position X1 existing on the first holding member 101a, the processing device 103 processes the first excess thickness portions 13a in accordance with the assembly design shape DSa. By performing NC processing on the first excess thickness portions 13a with the skin 11 and the stringers 13 in the assembly orientation, the processing device 103 is capable of reducing errors with respect to the assembly design shape DSa. In FIG. 3, among the three first excess thickness portions 13a, the leftmost first excess thickness portion 13a is a first excess thickness portion 13a after being subjected to the NC processing by the processing device 103. A surface of the first excess thickness portion 13a facing the second excess thickness portion 15b is cut to the assembly design shape DSa by the processing device 103. In FIG. 3, among the three first excess thickness portions 13a, the middle first excess thickness portion 13a and the rightmost first excess thickness portion 13a are first excess thickness portions 13a before being subjected to the NC processing by the processing device 103.

Since each stringer 13 includes the first excess thickness portion 13a, even if the assembly design shape DSa is positioned closer than the design shape DVa to the rib 15, it is possible to perform the NC processing on the stringers 13 (the first excess thickness portions 13a). Here, the height of each first excess thickness portion 13a in the vertical direction is determined by considering deviation caused by the effects of, for example, manufacturing errors or distortions of the skin 11 and the stringers 13. For example, the height of each first excess thickness portion 13a in the vertical direction is determined by adding to the design shape DVa a value that is greater than or equal to the deviation caused by the effects of, for example, manufacturing errors or distortions of the skin 11 and the stringers 13.

In FIG. 3, an assembly design shape (a design value) DSb of the rib 15 in which the reference position X1 on the first holding member 101a serves as a reference is illustrated by an alternate long and short dashed lines. Here, although the assembly design shape DSb of the rib 15 in which the reference position X1 serves as a reference is described, the assembly design shape DSb of the rib 15 may be a shape in which a reference position X2 serves as a reference. The assembly design shape DSb is an ideal shape in terms of design when the rib 15 in the assembly orientation is held by the second holding member 101b. It is desirable that the design shape DVb of the rib 15 above be the same as the assembly design shape DSb. However, due to, for example, manufacturing errors occurring when the rib 15 has been manufactured or distortions caused by the self-weight of the rib 15 in the assembly orientation, the design shape DVb of the rib 15 above may not be the same as the assembly design shape DSb. FIG. 3 illustrates the case in which the design shape DVb deviates from the assembly design shape DSb due to the effect of, for example, manufacturing errors or distortions.

With reference to the reference position X1 existing on the first holding member 101a, the processing device 103 performs NC processing on the second excess thickness portions 15b in accordance with the assembly design shape DSb. By performing the NC processing on the second excess thickness portions 15b with the rib 15 in the assembly orientation, the processing device 103 is capable of reducing errors with respect to the assembly design shape DSb. In FIG. 3, among the three second excess thickness portions 15b, the leftmost second excess thickness portion 15b is a second excess thickness portion 15b after being subjected to the NC processing by the processing device 103. A surface of the second excess thickness portion 15b facing the first excess thickness portion 13a is cut to the assembly design shape DSb by the processing device 103. In FIG. 3, among the three second excess thickness portions 15b, the middle second excess thickness portion 15b and the rightmost second excess thickness portion 15b are second excess thickness portions 15b before being subjected to the NC processing by the processing device 103.

Since the rib 15 includes the second excess thickness portions 15b, even if the assembly design shape DSb is positioned closer than the design shape DVb to the stringers 13, it is possible to perform the NC processing on the rib 15 (the second excess thickness portions 15b). Here, the height of each second excess thickness portion 15b in the vertical direction is determined by considering deviation caused by the effects of, for example, manufacturing errors or distortions of the rib 15. For example, the height of each second excess thickness portion 15b in the vertical direction is determined by adding to the design shape DVb a value that is greater than or equal to the deviation caused by the effects of, for example, manufacturing errors or distortions of the rib 15.

In this way, in the present embodiment, the processing device 103 performs the NC processing on the first excess thickness portions 13a and the second excess thickness portions 15b with reference to the reference position X1 existing on the first holding member 101a. However, the processing device 103 may perform the NC processing on the first excess thickness portions 13a and the second excess thickness portions 15b with reference to the reference position X2 existing on the second holding member 101b. Alternatively, the processing device 103 may perform the NC processing on the first excess thickness portions 13a with reference to the reference position X1, and may perform the NC processing on the second excess thickness portions 15b with reference to the reference position X2.

After the processing device 103 has performed the NC processing on all of the first excess thickness portions 13a on the basis of the assembly design shape DSa and all of the second excess thickness portions 15b on the basis of the assembly design shape DSb, at least one of the first holding member 101a or the second holding member 101b moves closer to the other of the first holding member 101a and the second holding member 101b. Here, the holding states of the first holding member 101a and the second holding member 101b (that is, the assembly orientations of the skin 11, the stringers 13, and the rib 15) are continued to be maintained. When the stringers 13 and the rib 15 come into contact with each other, the first holding member 101a and the second holding member 101b stop moving.

Here, the first excess thickness portions 13a of the respective stringers 13 are subjected to the NC processing to have the assembly design shape DSa, and the second excess thickness portions 15b of the rib 15 are subjected to the NC processing to have the assembly design shape DSb. Therefore, even if manufacturing errors occur when the assembly components (the skin 11, the stringers 13, the rib 15) are manufactured or distortions caused by the self-weights of the assembly components in the assembly orientation occur, it is possible to reduce the gap between the plurality of assembly components that are being assembled to an NC processing precision. Therefore, it is possible not to perform, for example, the step of measuring the gap between the plurality of assembly components, the step of manufacturing a shim, and the step of inserting the shim, and to simplify the operation of filling the gap between the plurality of assembly components.

The assembling device 100 causes the stringers 13 and the rib 15 in contact with each other to be fastened to each other with a fastener (not illustrated; such as a bolt). Therefore, the skin 11, the stringers 13, and the rib 15 are integrated with each other, and thus the main wing 5 is assembled.

As described above, the assembling device 100 of the present embodiment includes the processing device 103, and the processing device 103 processes the first excess thickness portions 13a of the stringers 13 and the second excess thickness portions 15b of the rib 15. Therefore, the processing device 103 is capable of processing the stringers 13 (the first excess thickness portions 13a) and the rib 15 (the second excess thickness portions 15b) in the assembly orientation to the corresponding ideal shapes (the corresponding assembly design shapes DSa and DSb) in terms of design. As a result, it is possible to simplify the operation of filling the gap between the plurality of assembly components and to facilitate the assembly operation of assembling the assembly components.

The processing device 103 processes the first excess thickness portions 13a and the second excess thickness portions 15b with reference to the reference position X1 existing on the first holding member 101a or the reference position X2 existing on the second holding member 101b. By processing the first excess thickness portions 13a and the second excess thickness portions 15b with reference to the reference position existing on the holding member 101, which is a jig, it is possible to process the stringers 13 (the first excess thickness portions 13a) in the assembly orientation and the rib 15 (the second excess thickness portions 15b) in the assembly orientation with high precision to have the corresponding ideal shapes (the corresponding assembly design shapes DSa and DSb) in terms of design.

Modification

Figure 4:
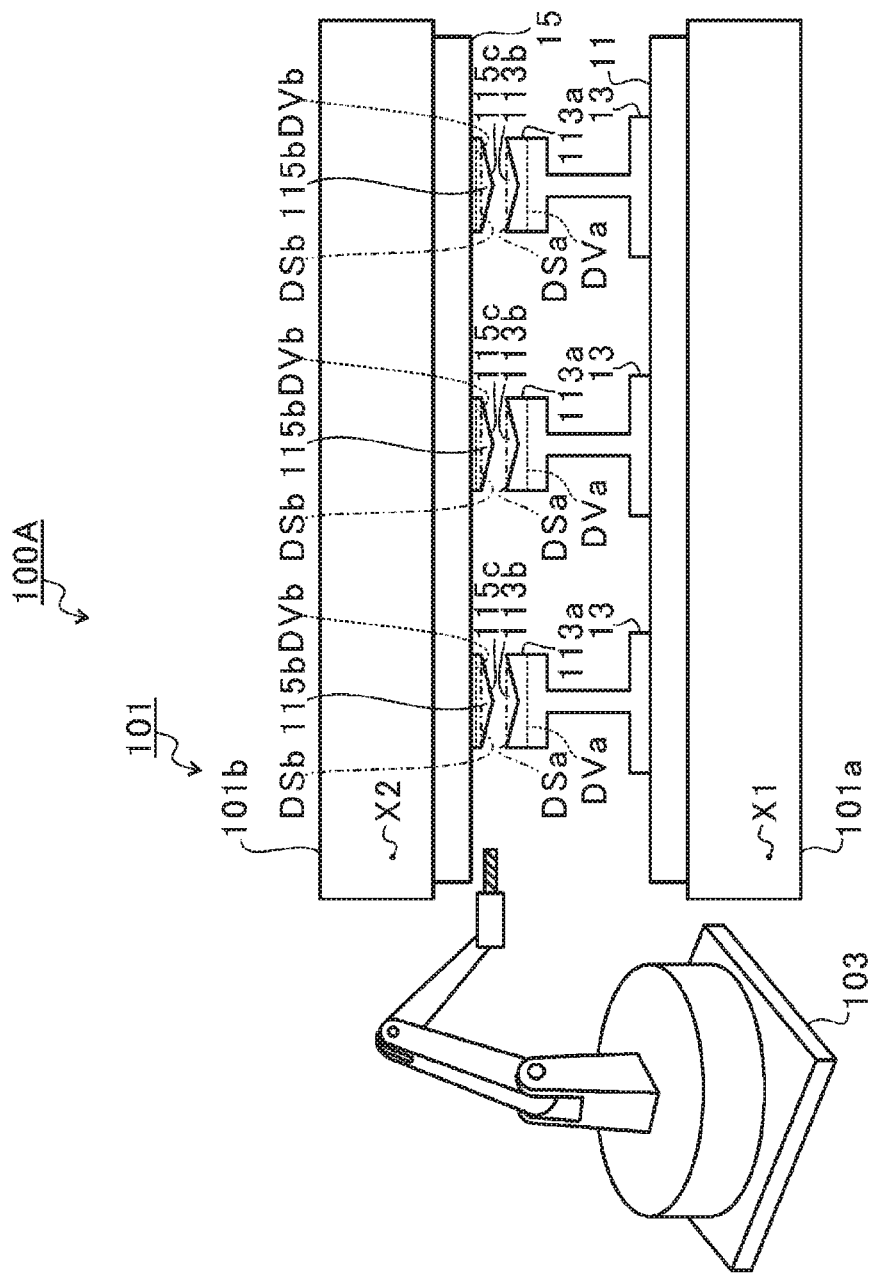
FIG. 4 is a schematic structural view illustrating a structure of an assembling device according to a modification.

FIG. 4 is a schematic structural view illustrating a structure of an assembling device 100A according to a modification. Structural components that substantially correspond to those of the embodiment above are given the same reference numerals and are not described below. FIG. 4 illustrates first excess thickness portions 113a after being processed into female portions on the basis of the assembly design shape DSa by the processing device 103 and second excess thickness portions 115b after being processed into male portions on the basis of the assembly design shape DSb by the processing device 103. As illustrated in FIG. 4, in the assembling device 100A of the present modification, the shapes of the processed first excess thickness portions 113a and the shapes of the processed second excess thickness portions 115b differ from the shapes of the first excess thickness portions 13a and the shapes of the second excess thickness portions 15b of the embodiment above. Since the other portions are the same as those of the assembling device 100 of the embodiment above, they are not described.

The processing device 103 of the present modification processes the first excess thickness portions 113a and the second excess thickness portions 115b so that at least a portion of each first excess thickness portion 113a has a shape differing from the assembly design shape DSa and at least a portion of each second excess thickness portion 115b has a shape differing from the assembly design shape DSb. For example, the processing device 103 processes the first excess thickness portions 113a to be smaller than the assembly design shape DSa. In addition, the processing device 103 processes the second excess thickness portions 115b to be larger than the assembly design shape DSb.

Each first excess thickness portion 113a has a varying height in a width direction of the stringers 13 (in FIG. 4, a left-right direction). For example, the height of each first excess thickness portion 113a gradually decreases with decreasing distance from the center of each stringer 13 in the width direction. In other words, the height of each first excess thickness portion 113a increases gradually with increasing distance from the center of each stringer 13 in the width direction. As illustrated in FIG. 4, each first excess thickness portion 113a has a hollow portion 113b having a central portion that is depressed with respect to the assembly design shape DSa. In one embodiment, the hollow portion 113b may serve as "a first position aligner".

Each second excess thickness portion 115b has a varying height in a width direction of the rib 15 (in FIG. 4, a left-right direction). For example, the height of each second excess thickness portion 115b gradually increases with decreasing distance from the center of the rib 15 in the width direction. In other words, the height of each second excess thickness portion 115b decreases gradually with increasing distance from the center of the rib 15 in the width direction. As illustrated in FIG. 4, each second excess thickness portion 115b has a protrusion 115c having a central portion that protrudes with respect to the assembly design shape DSb. In one embodiment, the protrusion 115c may serve as a "second position aligner".

When the first excess thickness portions 113a and the second excess thickness portions 115b come close to each other, the protrusions 115c are inserted into the hollow portions 113b. Facing surfaces of the hollow portions 113b and corresponding facing surfaces of the protrusions 115c that face each other are generally parallel to each other. Therefore, when the hollow portions 113b and the corresponding protrusions 115c have come into contact with each other, the facing surfaces of the hollow portions 113b and the corresponding facing surfaces of the protrusions 115c are in contact with each other. When the hollow portions 113b and the protrusions 115c have come into contact with each other, the positions of the stringers 13 and the position of the rib 15 in the vertical direction are determined. Here, the upper surface of the assembly design shape DSa on the upper side in the vertical direction generally coincides with the lower surface of the assembly design shape DSb on the lower side in the vertical direction. When the hollow portions 113b and the protrusions 115c have come into contact with each other, the hollow portions 113b and the protrusions 115c are also in contact with each other in the width direction of the stringers 13 and the rib 15 (in FIG. 4, the left-right direction). Therefore, the positions of the stringers 13 and the position of the rib 15 in the width direction (in FIG. 4, the left-right direction) are determined.

As described above, the assembling device 100A of the present modification includes the processing device 103, and the processing device 103 forms the hollow portions 113b in the first excess thickness portions 113a and forms the protrusions 115c on the second excess thickness portions 115b. In one embodiment, the hollow portion and the protrusion 115c may serve as a "first position aligner" and a "second position aligner" respectively. The protrusions 115c are formed in correspondence with the hollow portions 113b. The hollow portions 113b and the protrusions 115c are formed for performing aligning in a direction orthogonal to the direction in which the stringers 13 and the rib 15 face each other (in FIG. 4, the left-right direction). Therefore, the assembling device 100A is capable of facilitating the positioning of the stringers 13 and the rib 15 in the width direction in addition to the positioning of the stringers 13 and the rib 15 in the vertical direction. As in the embodiment above, it is possible to simplify the operation of filling the gap between the plurality of assembly components and to facilitate the assembly operation of assembling the assembly components.

Although an embodiment and a modification of the disclosure have been described above with reference to the attached drawings, needless to say, the disclosure is not limited to such an embodiment and a modification. It is obvious that any person skilled in the art can arrive at various exemplary changes and modifications within the category described in the scope of the claims, and such changes and modifications are understood to naturally belong to the technical scope of the embodiment of the disclosure.

In the embodiment and the modification above, the assembling devices 100 and 100A are described as being used to assemble a main wing 5 by using a skin 11, stringers 13, and a rib 15. However, the assembling devices 100 and 100A may be used to assemble the other types of wings by using a skin 11, stringers 13, and a rib 15. For example, the assembling devices 100 and 100A may be used to assemble a horizontal tail 7, a vertical tail 9, or a central wing by using a skin 11, stringers 13, and a rib 15.

In the embodiment and the modification above, the first excess thickness portions 13a and 113a and the second excess thickness portions 15b and 115b are described as being made of a metal. However, the first excess thickness portions 13a and 113a and the second excess thickness portions 15b and 115b may be made of a composite material. Here, when the first excess thickness portions 13a and 113a and the second excess thickness portions 15b and 115b are made of a metal, if the processing device 103 performs NC processing (cutting), an oxide film is removed. Therefore, post-processing for applying the oxide film is performed. In contrast, making the first excess thickness portions 13a and 113a and the second excess thickness portions 15b and 115b out of a composite material is advantageous in that such post-processing for applying an oxide film after the processing device 103 has performed NC processing is not performed.

In the embodiment and the modification above, the processing device 103 is described as processing the first excess thickness portions 13a and 113a and the second excess thickness portions 15b and 115b with reference to the reference position X1 existing on the holding member 101 or the reference position X2 existing on the holding member 101. However, the processing device 103 may process the first excess thickness portions 13a and 113a and the second excess thickness portions 15b and 115b with reference to a reference position differing from the reference positions X1 and X2. For example, the processing device 103 may process the first excess thickness portions 13a and 113a and the second excess thickness portions 15b and 115b with reference to a reference position existing on the ground.

In the modification above, the processing device 103 is described as forming the hollow portions 113b in the first excess thickness portions 113a and as forming the protrusions 115c on the second excess thickness portions 115b. However, the processing device 103 may form the protrusions 115c on the first excess thickness portions 113a and the hollow portions 113b in the second excess thickness portions 115b.

The invention claimed is:

1. An assembling device comprising:
   a holding member configured to hold a first assembly component and a second assembly component; and
   an NC processing machine including a cutting tool or a grinding tool and configured to process a first excess thickness portion and a second excess thickness portion, the first excess thickness portion being provided at the first assembly component and being configured to adjust a gap between the first assembly component and the second assembly component, the second excess thickness portion being provided at the second assembly component and being configured to adjust the gap,
   wherein the assembling device is configured to fasten the first assembly component and the second assembly component by a fastener with the first excess thickness portion and the second excess thickness portion being in direct contact,
   wherein the NC processing machine is configured to form a first position aligner at the first excess thickness portion and to form a second position aligner at the second excess thickness portion, the first position aligner being configured to perform aligning of the first excess thickness portion and the second excess thickness portion in a direction orthogonal to a direction in which the first assembly component and the second assembly component face each other, the second position aligner being provided in correspondence with the first position aligner.

2. The assembling device according to claim 1, wherein the NC processing machine is configured to process the first excess thickness portion and the second excess thickness portion with reference to a reference position existing on the holding member.

3. The assembling device according to claim 2, wherein the NC processing machine is configured to process the first excess thickness portion and the second excess thickness portion on a basis of a design shape of the first assembly component and a design shape of the second assembly component.

4. The assembling device according to claim 2, wherein the NC processing machine is configured to process a height of the first excess thickness portion in the vertical direction by adding a value that is greater than or equal to a deviation caused by effects of manufacturing errors or distortions of the first assembly component to a design shape of the first excess thickness.

5. The assembling device according to claim 4, wherein the NC processing machine is configured to process a height of the second excess thickness portion in the vertical direction by adding a value that is greater than or equal to the deviation caused by effects of manufacturing errors or distortions of the second assembly component to a design shape of the second excess thickness.

6. The assembling device according to claim 1, wherein the NC processing machine is configured to process the first excess thickness portion and the second excess thickness portion on a basis of a design shape of the first assembly component and a design shape of the second assembly component.

7. The assembling device according to claim 1, wherein the NC processing machine is configured to process a height of the first excess thickness portion in the vertical direction by adding a value that is greater than or equal to a deviation caused by effects of manufacturing errors or distortions of the first assembly component to a design shape of the first excess thickness.

8. The assembling device according to claim 7, wherein the NC processing machine is configured to process a height of the second excess thickness portion in the vertical direction by adding a value that is greater than or equal to the deviation caused by effects of manufacturing errors or distortions of the second assembly component to a design shape of the second excess thickness.

9. The assembling device according to claim 1, wherein the holding member comprises a first holding member and a second holding member, the first holding member holding a panel, the first assembly component, and the second assembly component, the second holding member holding the second assembly component in an assembly orientation at a location above the second assembly component, the first holding member being disposed below the panel and the first assembly component in a vertical direction, the second holding member being disposed above the second assembly component in a vertical direction.

10. The assembling device according to claim 9, wherein the NC processing machine is configured to process the first excess thickness portion and the second excess thickness portion with reference to a reference position existing on the second holding member.

11. The assembling device according to claim 1, wherein the first position aligner includes a hollow portion and the second position aligner includes a protrusion, and wherein in a state that the first member and the second member are fastened, the protrusion of the second position aligner is inserted into the hollow portion of the first position aligner.

* * * * *